United States Patent

Murphy

[11] Patent Number: 4,615,992
[45] Date of Patent: Oct. 7, 1986

[54] CATALYST REGENERATION PROCESS WITH IMPROVED CATALYST DISTRIBUTION IN A FLUIDIZED BED

[75] Inventor: James R. Murphy, Allentown, Pa.
[73] Assignee: Air Products and Chemicals, Inc., Allentown, Pa.
[21] Appl. No.: 718,922
[22] Filed: Apr. 2, 1985
[51] Int. Cl.⁴ .................. B01J 38/32; B01J 38/30; B01J 38/14; F27B 15/08
[52] U.S. Cl. .................. 502/41; 208/164; 422/144; 502/43; 502/52
[58] Field of Search .......... 502/41, 42, 44, 49, 502/52, 43; 208/164, 113

[56] References Cited

U.S. PATENT DOCUMENTS

| | | | |
|---|---|---|---|
| 2,477,345 | 7/1949 | Pelzer | 422/144 |
| 2,735,802 | 2/1956 | Jahnig | 422/144 |
| 3,902,990 | 9/1975 | Luckenbach | 208/164 |
| 3,904,548 | 9/1975 | Fagan et al. | 252/417 |
| 4,150,090 | 4/1979 | Murphy et al. | 422/144 |
| 4,197,418 | 4/1980 | Lee et al. | 208/120 |
| 4,353,812 | 10/1982 | Lomas et al. | 252/417 |
| 4,434,245 | 2/1984 | Lomas et al. | 502/2 |
| 4,439,533 | 3/1984 | Lomas et al. | 502/6 |

OTHER PUBLICATIONS

Oil & Gas Journal, Mar. 22, 1982, Johnson et al., "New Oil Era Prompts Unique Resid Refinery".

*Primary Examiner*—P. E. Konopka
*Attorney, Agent, or Firm*—Mark L. Rodgers; E. Eugene Innis; James C. Simmons

[57] ABSTRACT

The present invention provides for a process and associated apparatus for limiting the vertical mixing of catalyst in a fluidized catalyst regenerator so that spent catalyst entering the regenerator will remain at the top of the fluidized bed for a longer period of time. This is accomplished by employing a generally horizontally placed baffle device located between 2 ft.–4 ft. below the catalyst bed level in the regenerator.

8 Claims, 1 Drawing Figure

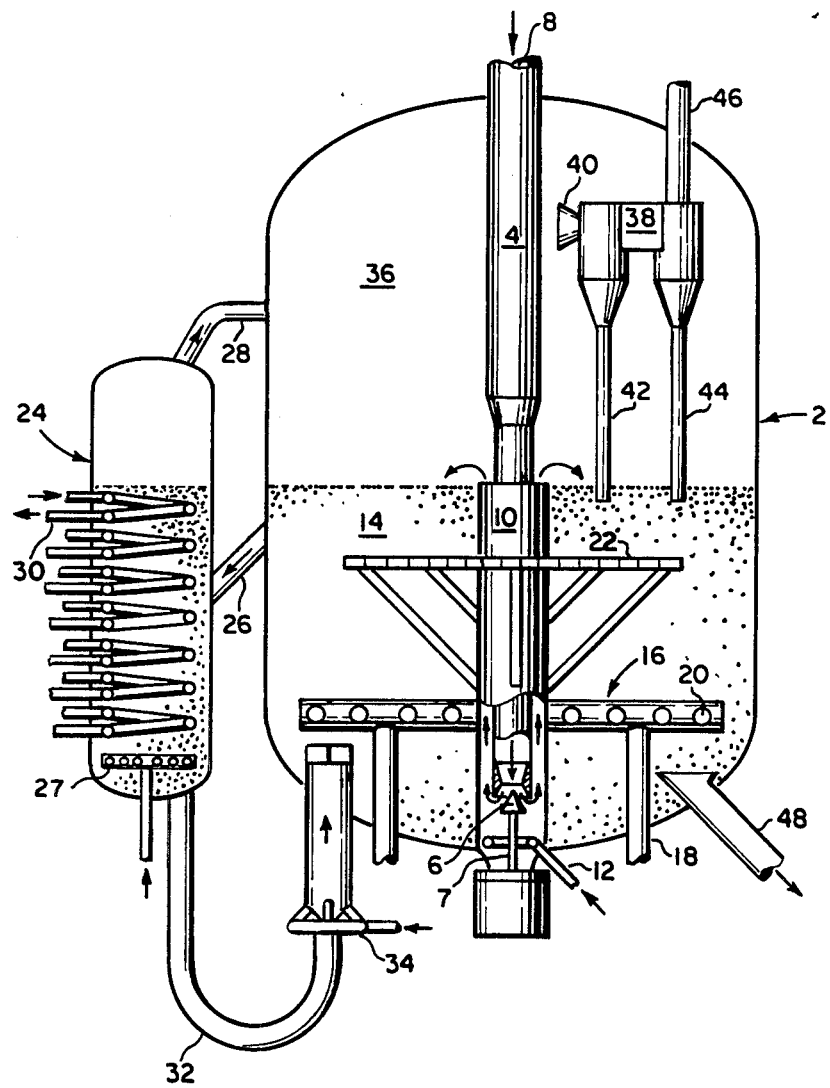

CATALYST REGENERATION PROCESS WITH IMPROVED CATALYST DISTRIBUTION IN A FLUIDIZED BED

TECHNICAL FIELD OF THE INVENTION

The present invention relates to a process and apparatus for regenerating spent catalyst. The invention is particularly applicable to fluidized catalyst systems such as those typically used in hydrocarbon conversion processes.

BACKGROUND OF THE INVENTION

Catalysts employed in hydrocarbon conversion processes become partially deactivated due to carbonaceous deposits accumulating on the catalyst surface. Various methods for regenerating the catalyst by combustion with an oxidizing gas have been developed.

U.S. Pat. No. 3,902,990 discloses a process for regenerating spent catalyst contaminated by carbonaceous deposits by contacting the spent catalyst with a hot flue gas emanating from a first dense phase regeneration zone. The heated spent catalyst is then contacted counter-currently with an oxygen-containing gas in the first dense phase regeneration zone to produce partially regenerated catalyst which is subsequently contacted concurrently with an oxygen-containing gas in a second dense phase regeneration zone.

In accordance with this process, hydrocarbons which are contained in the void spaces of spent catalysts are removed by stripping with a stripping gas in a zone located outside of the regenerator. The stripped spent catalyst then flows from the stripping zone through a conduit and into the regeneration vessel. The spent catalyst is discharged in upper regions of the vessel and flows in a downward direction and is contacted by a hot upflowing flue gas which combusts the coke and heats the catalyst. The heated catalyst then continues to flow down into the dense fluidized regeneration bed for further heating and oxidation of the carbonaceous material.

U.S. Pat. No. 3,904,548 discloses a method and system for recovering compounds deposited on catalysts in the hydrocarbon phase and effecting regeneration of catalyst particles in a swirl-type dense fluid catalyst bed regeneration operation. These objectives are accomplished by limiting the volume of regeneration gas brought in contact with the catalyst in selected vertical segments of the regeneration zone. The regeneration zone is supplied with regeneration gas in the lower portion thereof by a plurality of radiating distributing grids or segments individually controlled with respect to the volume of regenerating gas desired to be passed through any given segment.

U.S. Pat. No. 4,150,090 discloses an apparatus for regenerating spent catalyst. The apparatus incorporates a closed vessel having a centered stand pipe concentrically arranged within a spent catalyst distributor. The catalyst is carried upwardly by the distributor and is scattered evenly and concentrically about the distributor. The spent catalyst is deposited on or near the top of a dense phase catalyst bed by a plurality of radially extending catalyst distributor arms or troughs. Conduits convey a fluid such as steam to each of the radial arms to fluidize the catalyst particles and eject at least a portion of the catalyst at various points along the length of the arms, thereby providing better catalyst distribution into the dense phase catalyst bed. A symmetrically arranged air distributor system, which includes a number of transverse branches having small nozzles mounted thereon, form a grid pattern below the lower portions of the catalyst bed in the regenerator to provide air for burning the coke on the spent catalyst.

U.S. Pat. Nos. 4,353,812; 4,434,245 and 4,439,533 all disclose a process and related apparatus for regenerating and cooling hot fluidized catalysts. The spent catalysts entering the regenerator are dispersed to the dense fluid bed by being deflected off of a horizontal surface located above the catalyst inlet. The particles then flow from the dense phase fluidized bed into the shell side of a vertically oriented shell and tube heat exchanger where cooling occurs via indirect heat exchange with a cooling media circulating in the tubes. The cooled catalyst particles reenter the regenerator for further treatment before being discharged.

BRIEF SUMMARY OF THE INVENTION

The present invention involves a spent catalyst regenerator and a process for using the same which improves the distribution of spent catalyst in the regenerator. This new catalyst regenerator limits the vertical mixing of catalyst so that spent catalyst entering the regenerator remains at the upper portion of the fluidized catalyst bed for a period of time that permits initial regeneration at relatively mild temperatures.

The catalyst regenerator of the present invention comprises a vessel having a dense phase fluidized catalyst bed zone, and a catalyst disengagement zone, with a catalyst distributor means within the vessel for receiving and distributing spent catalyst to the upper portion of the fluidized catalyst bed. A baffle, such as a subway grating, is located between 2 feet to 4 feet from the top of the catalyst bed. Air distributor means extend into the lower portion of the vessel to supply air or oxidizing gas for catalyst regeneration. Means, such as an exit pipe, is mounted to the lower portion of the vessel for removing regenerated catalyst.

In one particular embodiment, an externally mounted catalyst cooler is connected via a catalyst inlet to the regenerator vessel at a point between the baffle device and the top of the catalyst bed. A catalyst outlet from the external cooler is connected to the bottom portion of the regenerator vessel for returning cooled catalyst. An air distributor is also located near the bottom of the external cooler for providing gas to fluidize the catalyst entering the cooler, and also for partially regenerating the catalyst.

The present invention reduces the occurrence of excessive particle temperatures, especially at the upper portion of the catalyst bed, thereby reducing the amount of catalyst deactivation during regeneration. This reduction in the occurrence of excessive particle temperature is achieved by placing a baffle or subway grating which inhibits the vertical mixing of the spent catalyst entering the regenerator with the hot, partially regenerated catalyst in the lower portion of the catalyst bed. Thus, by physically slowing down the rate of descent of catalyst at the top of the bed as well as by breaking up large catalyst containing bubbles rising from the bottom of the catalyst bed from the air distributor means excessive particle temperature is avoided.

BRIEF DESCRIPTION OF THE DRAWING

The single FIGURE is a sectional view of a preferred embodiment of the present invention.

DETAILED DESCRIPTION OF THE INVENTION

The present invention is an apparatus for regenerating spent catalyst and a process for using the same. The invention can best be understood by referring to the single FIGURE which represents a sectional view of a preferred embodiment of the present invention.

A closed regenerator vessel 2 is symmetrically arranged around a vertical stand pipe 4. The regenerator vessel 2 can be constructed of any suitable material known in the art, and is preferably constructed of an external metal skin with a ceramic interior surface. The stand pipe 4 opens downwardly into a tapered plug valve 6. Spent catalyst is introduced into the inlet 8 of the stand pipe 4 from a stripper (not shown). The flow of spent catalyst out of the stand pipe 4 is regulated by the valve 6. The valve 6 moves upwardly and downwardly on a valve stem 7 and is opened and closed to regulate the flow of catalyst. The stand pipe 4 is concentrically arranged on the interior of an upright well pipe 10 which is closed at its bottom end. A fluid inlet 12 is located below the plug valve 6, and serves as an injection point for a fluidizing gas to fluidize the spent catalyst from the stand pipe 4 and force it upwardly through the annular space within the well pipe 10. The well pipe 10 is open at its upper end, and the fluidized spent catalyst is discharged through the opening and into the top of a fluidized catalyst bed 14 in the regeneration vessel 2.

The catalyst at the upper portion of the catalyst bed is high in carbon content; i.e., about 1% carbon, usually in the form of coke. This carbon is oxidized with a gas having a relatively low oxygen content; i.e., between 3–5% $O_2$, to control the initial burning rate to avoid excessive catalyst particle temperatures which cause deactivation. Additionally, the $H_2$ is the coke is burned in the upper portion of the catalyst bed to limit contact between steam and the major portion of the catalyst bed. The gas or air used for oxidation is provided by an air distributor system 16 located at the lower portion of the catalyst bed. The air distributor system 16 comprises air inlets 18 for bringing air into the system and air outlet nozzles 20 for distributing the air into the catalyst bed.

A baffle or subway grating 22 is connected to the upright well pipe 10 and extends horizontally across at least a part of the catalyst bed between 2–4 ft. from the top of the bed. The subway grating 22 serves as the physical barrier which reduces the vertical mixing of the catalyst at the top of the bed with the catalyst near the bottom of the bed which is typically about 30°–50° C. hotter. The grating further reduces vertical mixing by disrupting large bubbles resulting from the aeration system 16 which carry hot catalyst from the bottom of the bed to the top. This reduction of vertical mixing within the catalyst bed allows the spent catalyst entering the regenerator vessel 2 to undergo oxidation at mild conditions for a longer period of time, thereby reducing the amount of catalyst deactivation due to overheating. Additionally, most of the $H_2$ in the coke is also burned at the top of the bed, thereby limiting the contact between the hot steam and the majority of catalysts in the bed.

Even when employing a subway grating or baffle 22, it is often important to cool the catalyst during regeneration to avoid excessive catalyst deactivation. Therefore, while some of the regenerated catalyst flows through the baffle 22 to the lower portion of the catalyst bed for further regeneration, preferably at least a portion flows to an external catalyst cooler 24 having a catalyst inlet, such as inclined stand pipe 26, connected to the regeneration vessel 2 at a point between the top of the catalyst bed and the subway grating 22. The catalyst entering the external cooler 24 is fluidized with a gas, such as air, which is introduced at the bottom of the cooler through an air distribution means 27 similar in design to the air distribution system 16 in the regeneration vessel 2. The fluidizing air may also accomplish a minor portion of coke burnoff; e.g., typically less than 5%. Flue gas from the top of the catalyst bed inside the external cooler 24 plus a small amount of entrained catalyst is returned to the upper portion of the regeneration vessel by a vent pipe 28 at the top of the external cooler 24. The $O_2$ present from the air feed is nearly completely depleted thereby preventing after-burning in the top of the regeneration vessel 2.

The dense phase catalyst bed level in the cooler is at, or slightly below, the regenerator bed level 14. The catalyst cooler bed is self-adjusting by the hydrostatic pressure balance between the catalyst cooler 24 and the regenerator 2. The catalyst is cooled by about 50° to 150° C. by circulating a coolant, such as water in coils 30 submerged in the dense phase catalyst bed of the cooler. Preferably, each coil is individually valved at inlet and outlet so that it can be isolated in the event of leakage. In cracking operations where catalyst cooling is not required, catalyst circulation through the cooler may be stopped by closing the catalyst inlet stand pipe 26, via a valve or other suitable means (not shown), or by stopping the lift air from injection nozzle 34.

The cooled catalyst is withdrawn from the bottom of the cooler through a catalyst outlet such as an aerated standpipe and U-bend 32 and is lifted back into the regenerator vessel 2 by air injection via injection nozzle 34. The catalyst recirculation rate through the external cooler 24 is controlled by varying the lift air rate from the injection nozzle 34. The recirculation rate is preferably adjusted to maximize the heat transfer coefficient thus minimizing the surface area of the cooling tubes.

The gaseous products of the coke oxidation along with excess regeneration or flue gas containing small uncollected portions of hot regenerated catalyst from both the catalyst cooler 24 and the fluidized catalyst bed 14 in the regenerator 2 flow up through a catalyst disengagement zone 36 in the regeneration vessel 2 and enter a separation means 38 through an inlet 40. The separation means 38 may be cyclone separators or any other effective means for the separation of particulated catalyst from a gas stream. Catalyst separated from the flue gas falls to the bottom of the catalyst disengagement zone 36 through conduits 42 and 44. The flue gas exits catalyst disengagement zone 36 via conduit 46 from which it may be vented or proceed to associated energy recovery systems.

A portion of the fluidized catalyst flows directly from the upper portion of the fluidized bed to the lower portion of the bed without flowing through the external cooler 24. This catalyst is mixed with the catalyst re-entering the regenerator from the external cooler 24, and the combined catalysts undergo further regeneration in the lower portion of the fluidized bed before being removed from the regenerator vessel 2 through a catalyst outlet 48 and returned as catalyst feed to a reaction vessel.

If spent catalyst having its highest carbon and highest hydrogen concentration is contacted with air having a high oxygen content at high temperatures, e.g., about 700° C., the initial burning rate is so fast that excessive particle temperatures are reached thereby causing catalyst deactivation. The basic advantage of the present regenerator design is that, by limiting the vertical mixing of catalyst within the regenerator, initial catalyst regeneration can be accomplished at relatively mild conditions; e.g. initial burning with a gas depleated in oxygen to about 3-5%, for longer periods of time than with previous regeneration systems, and thereby result in less catalyst deactivation due to overheating. Vertical mixing is reduced by the baffle or subway grating located about 2-4 ft. below the surface of the fluidized catalyst bed in the regenerator. The baffle device serves as a physical barrier which slows down the movement of the catalyst, and also serves as a surface to disrupt large bubbles emanating from the aeration system which tend to carry hot catalysts from the bottom of the fluidized bed to the cooler top portion of the bed. Use of this baffle device also allows a simple catalyst distribution means to be used and eliminates the need for a complex system of troughs and aerators as used in previous regenerators to assure even catalyst distribution. This allows for a simpler and more economical regenerator design.

Having thus described the present invention, what is now deemed appropriate for Letters Patent is set out in the following appended claims.

What is claimed is:

1. A process for regenerating spent catalyst which comprises:
   (a) passing said spent catalyst through a vertical stand pipe positioned within a regenerator vessel;
   (b) withdrawing said spent catalyst from the vertical stand pipe and introducing it into an upright well pipe which extends part way up the interior of the regenerator vessel and being concentrically arranged around the exterior of the vertical stand pipe;
   (c) withdrawing the spent catalyst from the upright well pipe and depositing it in a fluidized catalyst bed located within the regeneration vessel;
   (d) establishing a baffle or subway grating between 2 ft-4 ft below the top of the fluidized catalyst bed;
   (e) fluidizing said catalyst bed with an oxidizing agent to burn off carbon deposits on the catalysts, thereby regenerating said catalysts; and
   (f) withdrawing said regenerated catalysts from the regenerator vessel.

2. A process in accordance with claim 1 wherein at least a portion of the catalyst is withdrawn from the fluidized catalyst bed within the regeneration vessel, passed through an external catalyst cooler and subsequently returned to a lower portion of the fluidized catalyst bed within the regenerator.

3. A process in accordance with claim 2 wherein the fluidizing gas used to regenerate the spent catalyst above the subway grating has an oxygen content between 3-5%.

4. The process in accordance with claim 3 wherein the catalyst passed through the external catalyst cooler is fluidized by an air distributor system located in the bottom portion of said cooler.

5. The process in accordance with claim 4 wherein a minor portion of coke contained on the catalyst is burned off in the external cooler.

6. The process in accordance with claim 5 wherein the catalyst is cooled by about 50° to 150° C. in the catalyst cooler.

7. The process in accordance with claim 6 wherein the average temperature of the fluidized catalyst bed above the baffle device is maintained about 30°-50° C. cooler than the average temperature of the fluidized bed below the baffle device.

8. The process in accordance with claim 7 wherein flue gas from the regeneration process is passed through a separation means to remove particulate catalyst within said flue gas and return it to the fluidized catalyst bed prior to venting the flue gas.

* * * * *